United States Patent [19]

Pick

[11] 3,984,504

[45] Oct. 5, 1976

[54] METHOD AND APPARATUS FOR PREVENTING WATER HAMMER IN HIGH PRESSURE STEAM INJECTION WATER HEATERS

[75] Inventor: Alan E. Pick, West Bend, Wis.

[73] Assignee: Pick Heaters, Inc., West Bend, Wis.

[22] Filed: Feb. 24, 1975

[21] Appl. No.: 552,490

[52] U.S. Cl. .................................. 261/76; 122/442; 239/417.3; 239/432; 261/DIG. 10
[51] Int. Cl.² .................................. B01F 3/04
[58] Field of Search ............... 261/DIG. 10, 76, 38, 261/40; 122/422, 438, 441, 442; 239/338, 370, 371, 417.3, 432

[56] References Cited
UNITED STATES PATENTS

| | | |
|---|---|---|
| 532,374 | 1/1895 | Hermes .......................... 261/76 X |
| 1,140,548 | 5/1915 | Vogelsang ........................... 261/76 |
| 1,144,719 | 6/1915 | Melas ............................. 261/76 X |
| 2,455,498 | 12/1948 | Kern ......................... 261/DIG. 10 X |

Primary Examiner—Frank W. Lutter
Assistant Examiner—William Cuchlinski, Jr.
Attorney, Agent, or Firm—Joseph P. House, Jr.

[57] ABSTRACT

A foraminous steam injection tube is mounted within a heating chamber to inject steam into water flowing through the heating chamber to heat the water. A foraminous diffusion screen is mounted around the steam injection tube and in spaced tandem relation, to diffuse the steam jets issuing therefrom, suppress the formation of large bubbles and to eliminate water hammer in the system.

13 Claims, 4 Drawing Figures

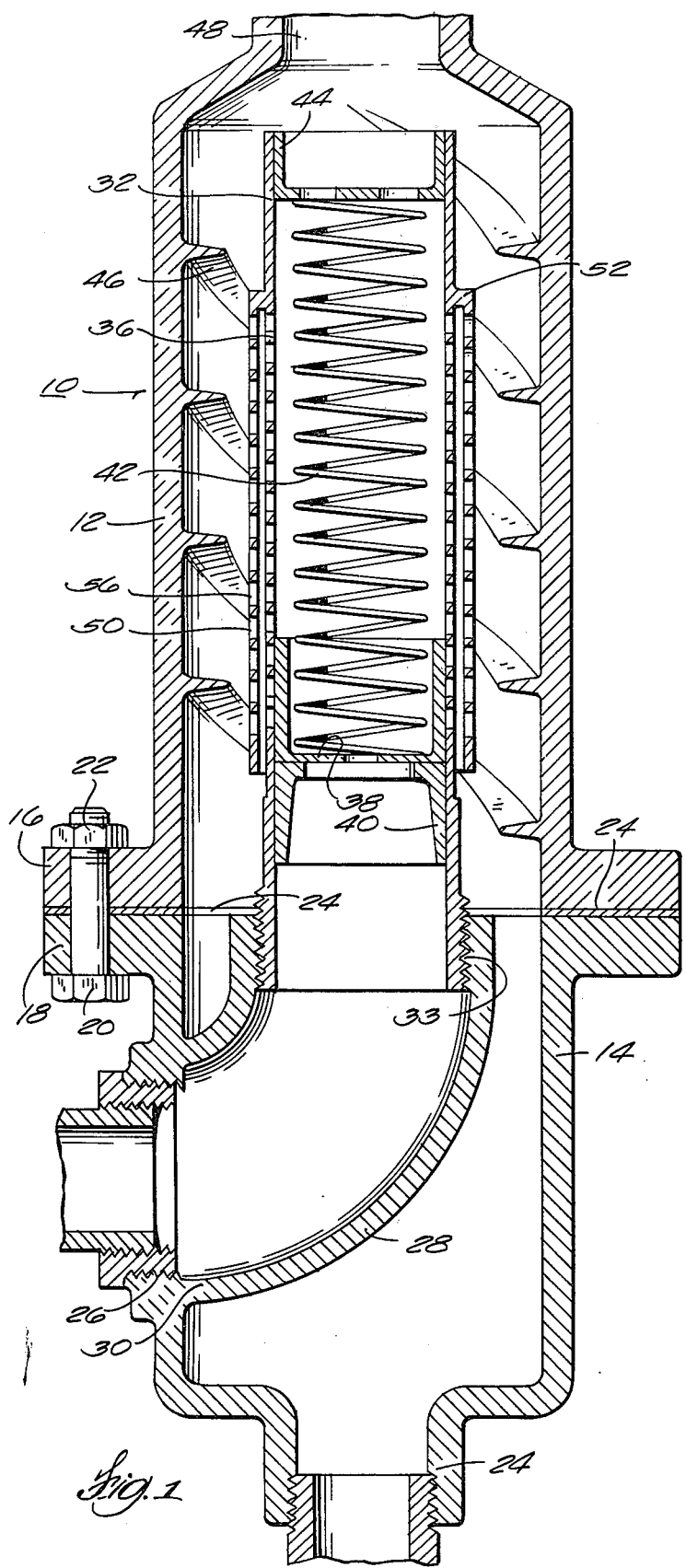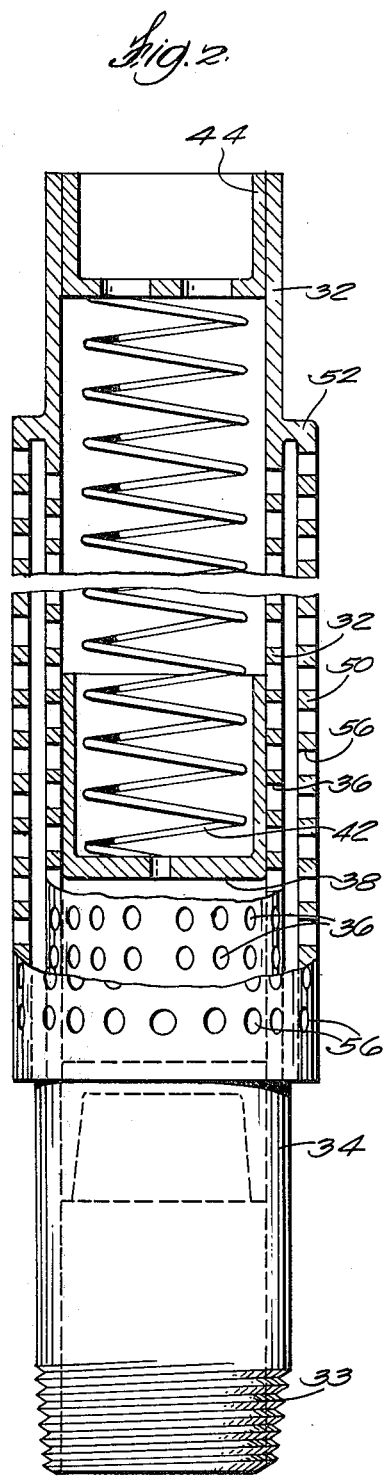

METHOD AND APPARATUS FOR PREVENTING WATER HAMMER IN HIGH PRESSURE STEAM INJECTION WATER HEATERS

BACKGROUND OF THE INVENTION

In the past, steam injection elements have been employed to heat water in a heating chamber by injecting steam into the water. A typical prior art steam injection water heater is disclosed in U.S. Pat. No. 2,455,498 to C. T. Kern. These heaters worked satisfactorily at relatively low steam pressures, e.g., below 300 psi. At high steam pressures, water hammer develops in the system, presumably due to sudden collapse of relatively large steam bubbles which are created by the high pressure steam, as the steam condenses in the water. The orifices in the foraminous steam injection element were made smaller in an attempt to eliminate the water hammer, but it persisted, notwithstanding substantial reduction in orifice size. Moreover, there is a limit to reduction in the size of the orifices, since they must inject a sufficient volume of steam into the water to heat it to the desired temperature.

SUMMARY OF THE INVENTION

In accordance with the present invention, water hammer is eliminated in high pressure steam injection water heaters by surrounding the foraminous steam injection tube thereof with a foraminous diffusion screen spaced from the injection tube for diffusing the steam jets issuing from the steam injection element before they condense. The diffusion screen suppresses bubble size and eliminates water hammer.

DESCRIPTION OF THE DRAWINGS

FIG. 1 is an axial sectional view of a steam injection heater utilizing the foraminous diffusion screen of this invention.

FIG. 2 is an enlarged view of the steam injection tube and diffusion screen of FIG. 1, partly in side elevation and partly in axial section.

DESCRIPTION OF THE PREFERRED EMBODIMENTS

Figure 3:
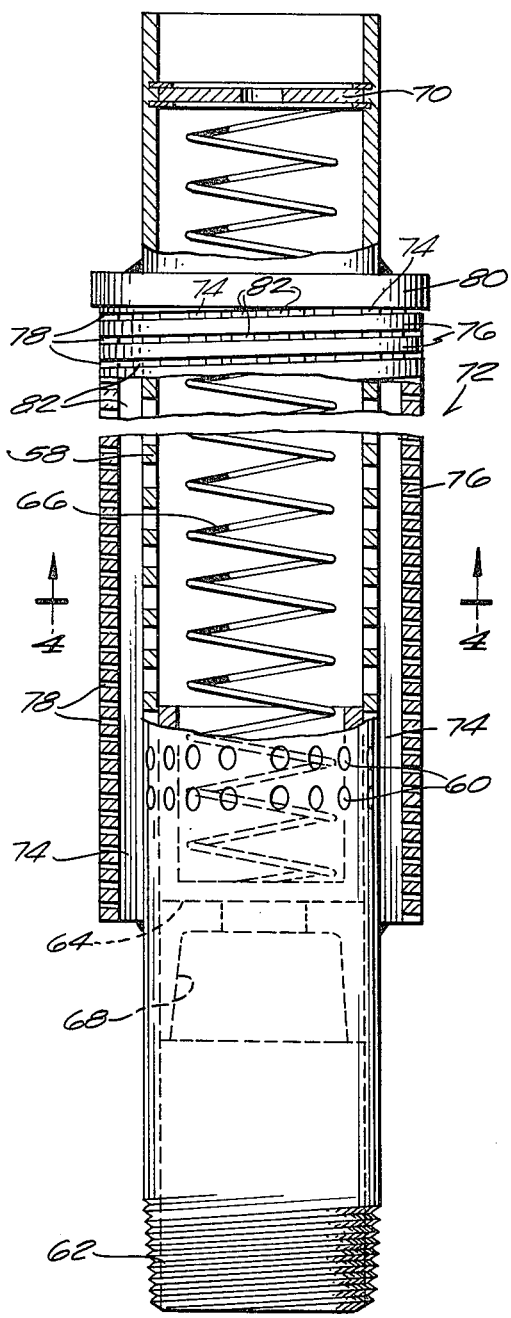
FIG. 3 is an enlarged side elevational view of a modified steam injection tube and diffusion screen with the steam injection tube and diffusion screen partially cut away.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

One embodiment of the steam injection heater of this invention includes a heating chamber 10 (FIG. 1) which consists of a cylindrical casing 12 and a base portion 14. These are flanged at 16 and 18 respectively and are held together by bolts 20 and nuts 22. Bolts 20 extend through matching openings in flanges 16 and 18. A gasket 24 seals the joint between flanges 16 and 18. Base portion 14 has a liquid inlet 24 at its bottom and has a steam inlet 26 at its side. A steam inlet elbow 28 extends inwardly within base portion 14 from inlet 26 and is supported by being attached at its side margin 30 to base portion 14. Steam inlet elbow 28 is preferably integrally cast with base portion 14.

A foraminous steam injection tube 32 is connected by screw threads 33 at its base portion 34 to matching screw threads in the top of steam inlet elbow 28. Steam injection tube 32 is in the shape of a hollow cylinder and has a plurality of circular orifices 36 therein. Orifices 36 are enlarged in FIG. 2 for clarity of illustration. For example, they may have a diameter in the neighborhood of 0.055 inches, for a tube 32 1 inch in diameter.

A piston 38 is slidably mounted within tube 32 and is normally urged downward toward a piston stop ring 40 in the bottom of tube 32 by a compression coil spring 42 which is held in place at its upper end by spring stop ring 44 in the top of tube 32. When steam under pressure is introduced into steam inlet 26, the steam pressure forces piston 38 upwardly and exposes some of the orifices 36. The steam then discharges as small jets through orifices 36 and is absorbed into and heats the surrounding water, which is introduced into water inlet 24 and is guided in a helical path around steam injection tube 32 by helical vanes 46, which extend inwardly from the interior of casing 12. The heated water and condensed steam leaves the heating chamber 10 through water outlet 48 at the top of casing 12.

The higher the pressure of the steam, the higher will piston 38 be raised, and the more orifices 36 will be exposed to discharge steam jets into the surrounding water. In the device as thus far described, and as described in U.S. Pat. No. 2,455,498, the steam enters the water in the form of bubbles. As steam pressure increases, the bubbles grow larger. The increasing use of high pressure steam has created a water hammer problem in devices of this type, as the large bubbles will collapse violently as the steam condenses, with resultant water hammer noise.

In accordance with the present invention, water hammer at high steam pressures is avoided by a mounting a foraminous diffusion screen 50 concentrically about steam injection tube 32 and surrounding the perforated portions thereof. Diffusion screen 50 is cylindrical in shape and is coaxial with tube 32. Diffusion screen 50 has a plurality of orifices 56 therein which intercept and diffuse the jets of steam coming from steam injection tube orifices 36. Orifices 56 can assume various shapes. In the embodiment of FIG. 2, they are circular. Screen 50 has an upper flange 52 welded or brazed to steam injection tube 32 at the portion thereof immediately above the orificed area therein.

Orifices 56 in diffusion screen 50 are enlarged in FIG. 2 for clarity of illustration. In practice, their diameter will depend on the steam pressure. A typical diameter for orifice is 0.020 inches. In an injection heater having a diffusion screen diameter one and one-half inches in diameter, diffusion screen 50 is spaced from steam injection tube 32 by approximately five thirty-seconds of an inch. It should be noted, however, that the above-mentioned dimensions are exemplary and can be varied in practice over a reasonable range, depending on the steam pressure, water flow rate, desired temperature, and other design factors involved in any given application of the heater.

Figure 4:
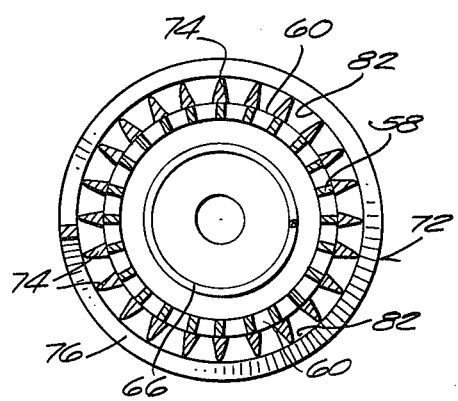
FIG. 4 is a cross-sectional view taken on the line 4—4 of FIG. 3.

FIGS. 3 and 4 show another embodiment of the steam injection element of this invention which includes a foraminous steam injection tube 58 having circular orifices 60 therein. Tube 58 is threaded at its bottom end 62 and has a piston 64 slidably mounted therein. A compression spring 66 normally urges piston 64 downwardly toward a piston stop ring 68 attached within tube 58. A removable spring stop ring 70 is attached within the top of tube 58 to anchor the top of spring 66. As in the previously described embodiment, none of orifices 60 are exposed at zero steam pressure. As piston 64 is moved upwardly because of increase in the steam pressure, an increasing number of orifices 60 are uncovered. Steam escapes through the exposed orifices 60 and forms outwardly directed steam jets therethrough.

A foraminous diffusion screen 72 is mounted over the perforated portion of tube 58 and serves to intercept and diffuse the steam jets issuing from orifices 60. Screen 72 comprises a helical coil 76 whose adjacent turns are spaced apart to form slots 78. Screen 72 is spaced and supported from screen 58 by a series of axially extending spacer ribs 74. These are arranged in a squirrel cage pattern around steam injection tube 58 and are welded or brazed at their top end to a ring 80, which is also welded or brazed to tube 58 and to the top of helical coil 76. The slot space 78 between adjacent turns of helical coil 76 varies, depending on the steam pressure employed. For example, a spacing of 0.010 inches may be used for steam in the range of 300–600 psi and a narrower spacing of 0.003 inches may be used for higher pressures. Helical coil 76 is preferably rectangular in cross-sectional shape although other shapes can be employed, if desired. Circular orifices 60 in injection tube 58 typically have a diameter in the neighborhood of 0.055 inches, and the interior of helical coil 76 is spaced approximately five thirty-seconds inches from the exterior of tube 58. However, it should be understood that the above-noted dimensions are exemplary and can be varied in practice over a reasonable range, depending on the steam pressure, water flow rate, desired temperature, and other design factors involved in any given application of the heater.

As best shown in FIG. 4, the slots 78 between adjacent turns of helical coil 76 are broken up by ribs 74 into circumferentially elongated orifice slots 82 which are approximately one-eighth inch long. Each slot segment 82 forms a narrow slot orifice which intercepts the steam jets escaping from circular orifices 60 to reduce the size of bubbles formed in the heating chamber and eliminate water hammer in the system.

In all embodiments the steam must pass through two tandem related screens before admixture thereof with the water. The outer screen has much smaller orifices than the inner screen. The outer screen intercepts the steam jets issuing from the orifices in the first screen and squeezes the jet into a smaller compass or envelope. Accordingly, the jet emerging from diffusion screens 50, 72 contains steam bubbles of a reduced size as compared with bubble sizes in the absence of the diffusion screen. Reduction of bubble size reduces the violence of bubble collapse as the steam condenses and eliminates water hammer noise.

Apparatus embodying the invention can vary in size and capacity. In practice, steam injection tubes 32, 58 are made in different sizes, from three-fourths inch diameter to 5 inch diameter.

The method of the present invention has been disclosed in connection with the description of the apparatus. In summary, it comprises reducing bubble size by intercepting the steam jets and diffusing or squeezing the jets into a smaller compass or envelope as they enter the water. Hence the bubbles will be smaller and their collapse will be less violent than would otherwise be the case. Water hammer noise is thus eliminated.

What is claimed is:

1. In a steam injection liquid heater having a heating chamber, inlet means to supply liquid to said heating chamber and a foraminous steam injection tube comprising a steam chamber within said heating chamber for injecting steam jets from the steam chamber into liquid in said heating chamber to heat the same, the improvement for reducing water hammer noise as the steam mixes with the liquid and comprising means to intercept said steam jets and disposed about said steam injection tube for intercepting jets of steam issuing therefrom and diffusing said jets as they enter the liquid.

2. The heater of claim 1 wherein said means to intercept said steam jets comprises a foraminous screen and means mounting said screen in spaced relation to said steam injection tube.

3. The heater of claim 2 wherein said steam injection tube and said foraminous screen are both cylindrical in shape and are mounted in coaxial relationship.

4. The heater of claim 3 wherein said foraminous screen comprises a helical coil, adjacent turns of said helical coil being spaced relatively close together to form a slot orifice therebetween for diffusing the steam jets issuing from said steam injection tube.

5. The heater of claim 4 wherein said helical coil is rectangular in cross-sectional shape.

6. The heater of claim 4 in which the means for mounting said screen comprises a series of axially extending ribs between the tube and the screen.

7. The heater of claim 6 in which said ribs intersect said slot orifice to subdivide the slot into a series of helically related slot orifices.

8. The heater of claim 3 wherein said steam injection element and said diffusion screen both have circular openings therein which form steam orifices.

9. A method of preventing water hammer in a steam injection water heater having an orificed steam injection tube surrounded by a body of water which injects jets of steam into said body of water about the tube to form steam bubbles in the body of water, said method comprising intercepting said jets of steam after they have issued from the orifices in the tube and before the bubbles have formed, thus to diffuse said intercepted jets and reduce the size of bubbles formed by said jets in said body of water.

10. The method of claim 9 in which the steam jets are intercepted by interposing a foraminous screen between said orificed steam injection tube and said body of water.

11. The method of claim 10 in which the foraminous screen has orifices smaller than the orifices of the injection tube.

12. A method of preventing water hammer in a steam injection water heater having a heating chamber containing water and means for jetting steam into the water to form steam bubbles in the water, said method comprising reducing the size of bubble growth in said body of water by jetting the steam into the water through first and second tandem related foraminous screens, said second screen intercepting steam jets injected into the water through the first screen.

13. The method of claim 12 in which the second foraminous screen has smaller orifices than the first screen.

* * * * *